US010536829B2

(12) United States Patent
Kashiwase

(10) Patent No.: US 10,536,829 B2
(45) Date of Patent: Jan. 14, 2020

(54) RADIO COMMUNICATION APPARATUS AND NETWORK-SIDE APPARATUS

(71) Applicant: KYOCERA CORPORATION, Kyoto (JP)

(72) Inventor: Susumu Kashiwase, Machida (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/754,357

(22) PCT Filed: Aug. 16, 2016

(86) PCT No.: PCT/JP2016/073914
§ 371 (c)(1),
(2) Date: Feb. 22, 2018

(87) PCT Pub. No.: WO2017/033799
PCT Pub. Date: Mar. 2, 2017

(65) Prior Publication Data
US 2018/0242128 A1 Aug. 23, 2018

(30) Foreign Application Priority Data

Aug. 26, 2015 (JP) ................................ 2015-166353

(51) Int. Cl.
H04W 4/46 (2018.01)
H04W 16/28 (2009.01)
H04W 4/48 (2018.01)
G08G 1/01 (2006.01)
H04W 92/18 (2009.01)

(52) U.S. Cl.
CPC ............... H04W 4/46 (2018.02); H04W 4/48 (2018.02); H04W 16/28 (2013.01); G08G 1/0133 (2013.01); H04W 92/18 (2013.01)

(58) Field of Classification Search
CPC ......... H04W 4/46; H04W 4/027; H04W 4/48; H04W 16/28
USPC ....... 455/41.2, 41.1, 522, 3.01, 452.1, 456.1
See application file for complete search history.

(56) References Cited

U.S. PATENT DOCUMENTS

2017/0215154 A1* 7/2017 Kim ...................... H04W 52/24
2018/0227882 A1* 8/2018 Freda .................... H04W 8/005

FOREIGN PATENT DOCUMENTS

| JP | 2005-174237 A | 6/2005 |
| JP | 2006-343814 A | 12/2006 |
| JP | 2008-227797 A | 9/2008 |
| JP | 2010-252357 A | 11/2010 |

OTHER PUBLICATIONS

International Search Report issued in PCT/JP2016/073914; dated Nov. 15, 2016.

* cited by examiner

Primary Examiner — John J Lee
(74) Attorney, Agent, or Firm — Studebaker & Brackett PC

(57) ABSTRACT

A radio communication apparatus according to one embodiment is mounted on a vehicle (V), configured to perform vehicle-to-vehicle communication with another vehicle by using a predetermined frequency band. The radio communication apparatus comprises a controller configured to control a transmission power and/or a transmission directivity in the vehicle-to-vehicle communication to restrain generation of interference in the predetermined frequency band, based on a congestion situation parameter regarding a congestion situation of a road (R) on which the vehicle travels.

5 Claims, 13 Drawing Sheets

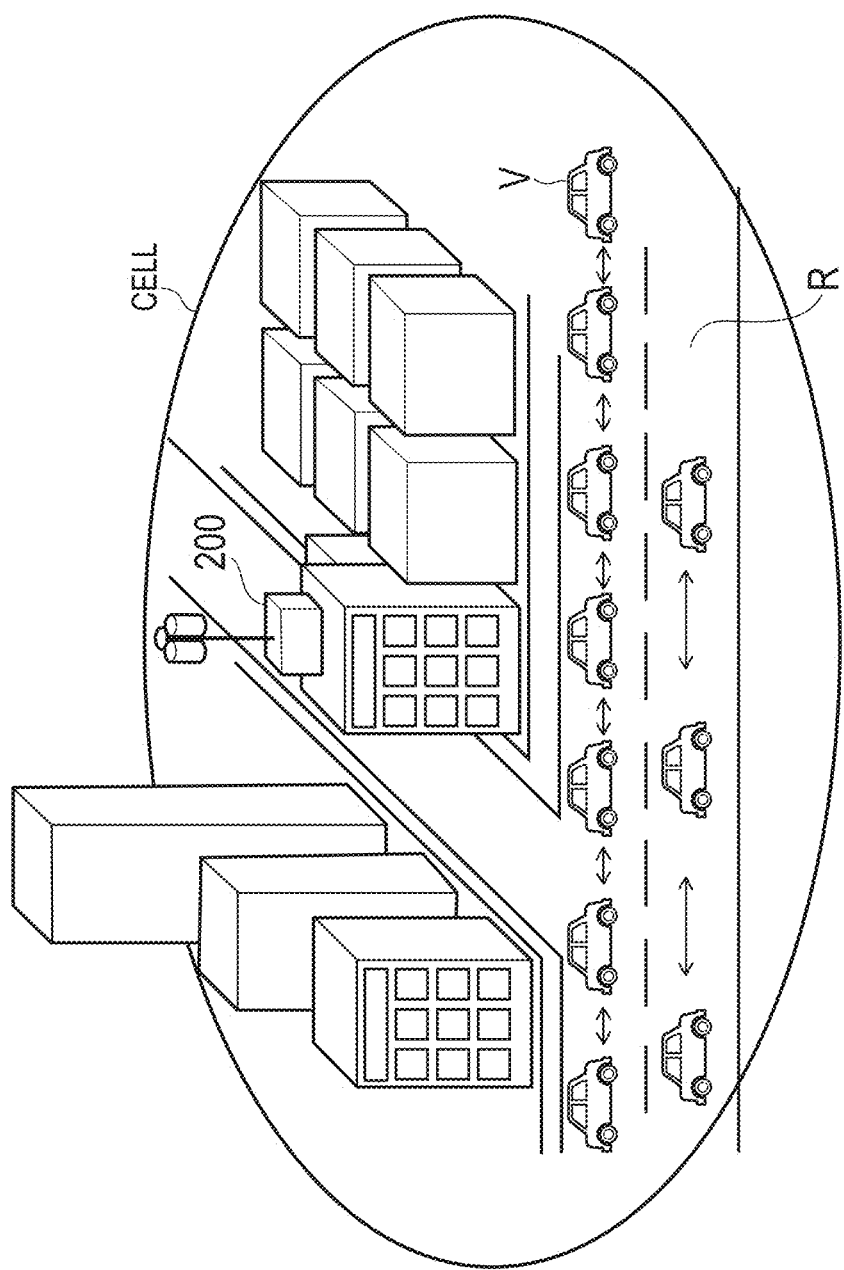

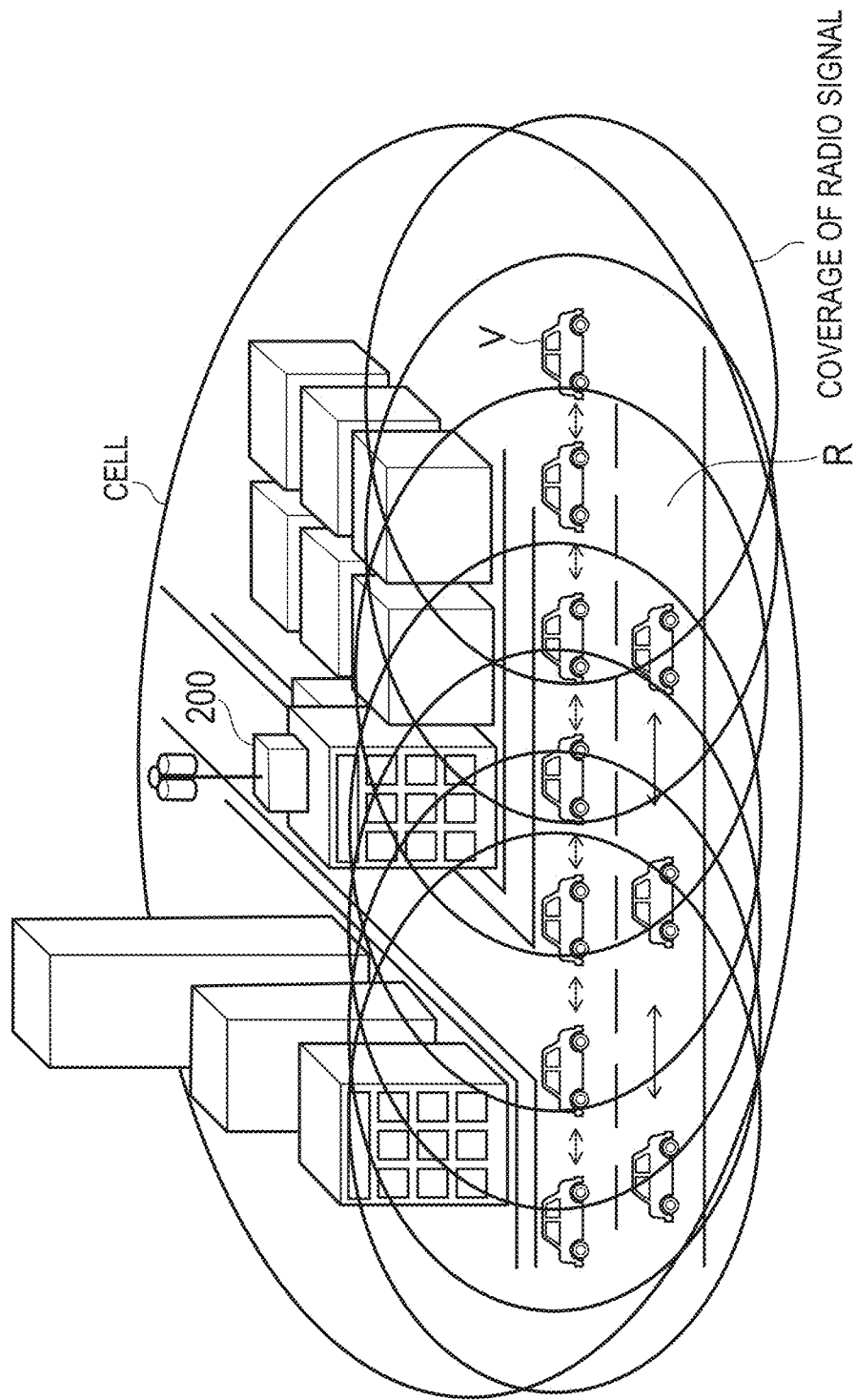

COVERAGE OF RADIO SIGNAL

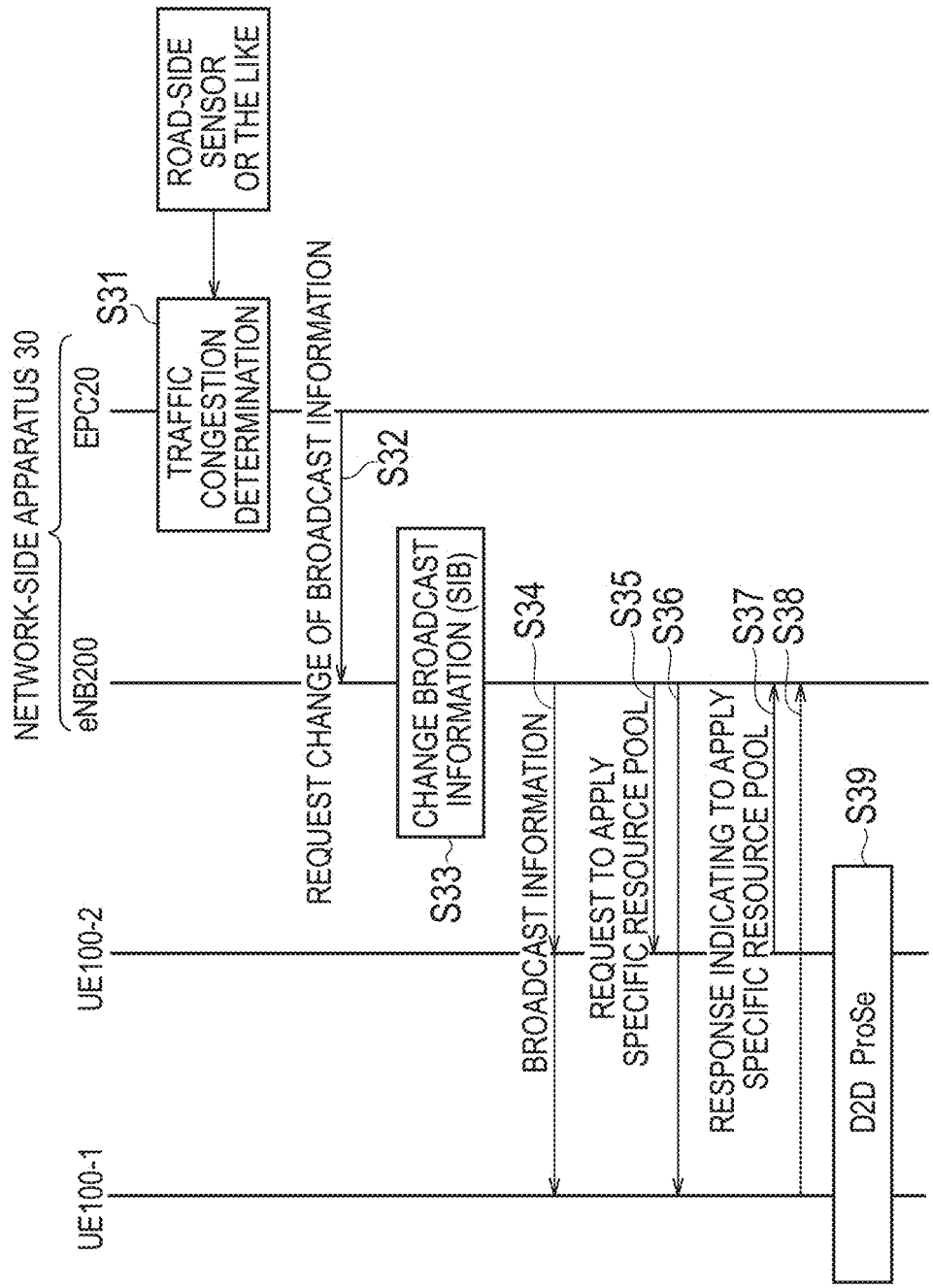

RADIO COMMUNICATION APPARATUS AND NETWORK-SIDE APPARATUS

TECHNICAL FIELD

The present application relates to a radio communication apparatus and a network-side apparatus, used in a system for supporting a device-to-device (D2D) proximity service.

BACKGROUND ART

In recent years, communication in which a vehicle including a radio communication apparatus performs communication with another vehicle without passing through a base station, that is, vehicle-to-vehicle communication, has been widely studied. Such vehicle-to-vehicle communication is one type of a D2D proximity service. It is noted that the D2D is also referred to as "peer-to-peer (P2P)".

In the radio communication apparatus configured to perform the vehicle-to-vehicle communication, it is proposed a technology for controlling a directivity of a radio signal to be transmitted and received (see Patent Document 1). Specifically, in the radio communication apparatus described in the Patent Document 1, if it is determined that the vehicle including the radio communication apparatus enters a traffic intersection, the directivity is changed from a traveling direction to a right-and-left direction to make the vehicle-to-vehicle communication smooth with another vehicle running in the right-and-left direction relative to the traveling direction of the vehicle.

PRIOR ART DOCUMENT

Patent Document

Patent Document 1: Japanese Patent Application Publication No. 2005-174237

SUMMARY

A radio communication apparatus according to one embodiment is mounted on a vehicle, configured to perform vehicle-to-vehicle communication with another vehicle by using a predetermined frequency band. The radio communication apparatus comprises a controller configured to control a transmission power and/or a transmission directivity in the vehicle-to-vehicle communication to restrain generation of interference in the predetermined frequency band, based on a congestion situation parameter regarding a congestion situation of a road on which the vehicle travels.

A network-side apparatus according to one embodiment is used in a system including a radio communication apparatus that is mounted on a vehicle and is configured to perform vehicle-to-vehicle communication with another vehicle by using a predetermined frequency band. The network-side apparatus comprises a controller configured to notify the radio communication apparatus of a control parameter for controlling a transmission power and/or a transmission directivity in the vehicle-to-vehicle communication to prevent generation of interference in the predetermined frequency band, based on a congestion situation parameter regarding a congestion situation of a road on which the vehicle travels.

A network-side apparatus according to one embodiment comprises a controller configured to notify a radio communication apparatus utilizing a device-to-device (D2D) proximity service, of a directivity control parameter for controlling a transmission directivity in the D2D proximity service.

BRIEF DESCRIPTION OF THE DRAWINGS

FIG. 6 is a diagram illustrating an application scenario according to a first embodiment to a third embodiment.

FIG. 7 is a diagram illustrating a coverage of a radio signal in vehicle-to-vehicle communication (D2D proximity service).

FIG. 15 is a diagram illustrating an operation sequence according to the third embodiment.

DESCRIPTION OF THE EMBODIMENT

Overview of Embodiments

Figure 1:
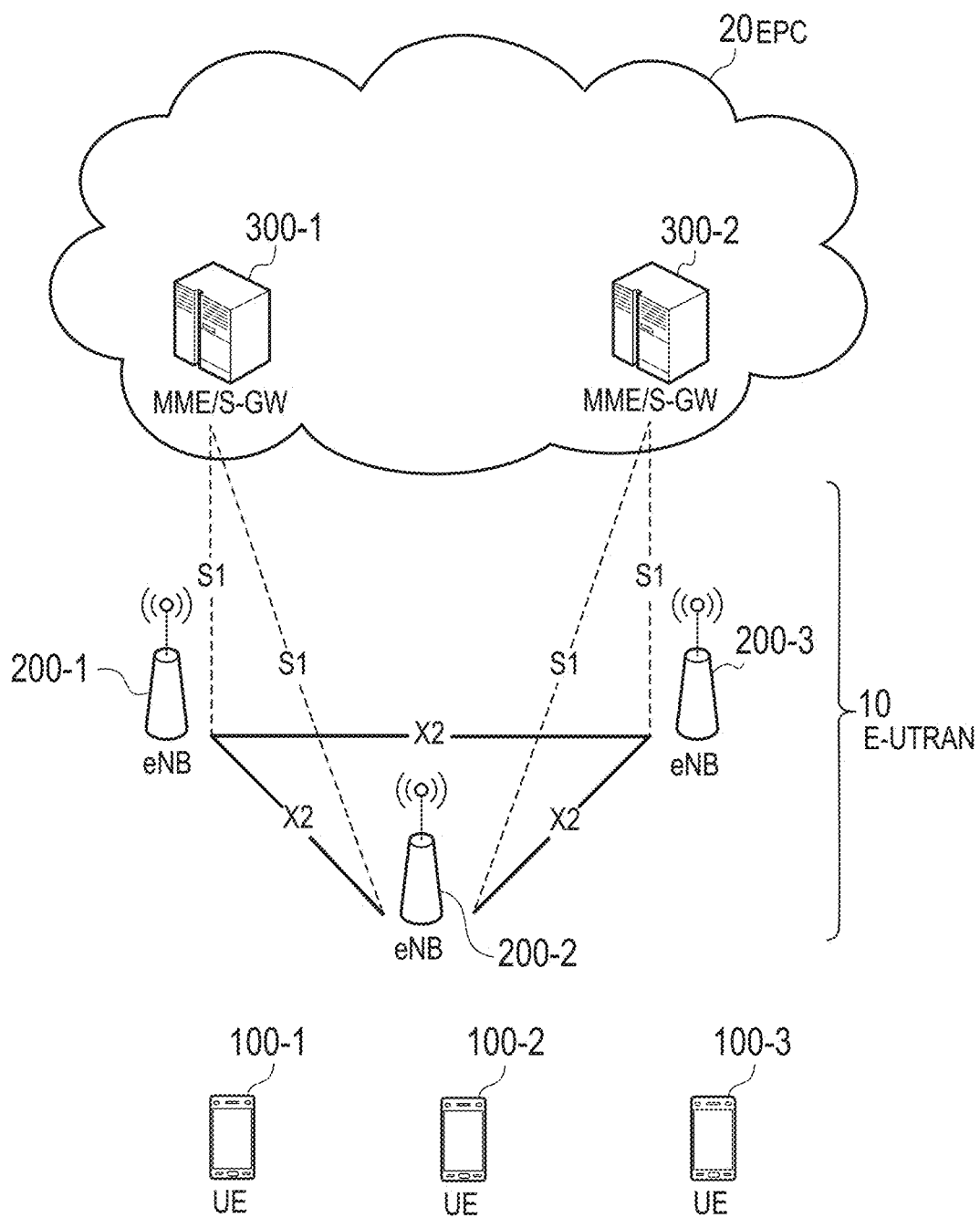
FIG. 1 is a diagram illustrating a configuration of an LTE system.

A radio communication apparatus according to the embodiments is mounted on a vehicle, configured to perform vehicle-to-vehicle communication with another vehicle by using a predetermined frequency band. The radio communication apparatus comprises a controller configured to control a transmission power and/or a transmission directivity in the vehicle-to-vehicle communication to restrain generation of interference in the predetermined frequency band, based on a congestion situation parameter regarding a congestion situation of a road on which the vehicle travels.

The controller is configured to perform a control of decreasing the transmission power and/or a control of narrowing the transmission directivity, based on the congestion situation parameter, if determining that a traffic congestion occurs.

The congestion situation parameter may include a movement speed of the vehicle and/or a distance between the vehicle and the other vehicle.

The controller may determine, based on the decrease of the movement speed and/or the shortening of the distance, that the traffic congestion occurs.

The controller may perform a control of performing omnidirectional transmission, if determining, based on the congestion situation parameter, that the traffic congestion does not occur.

The controller may acquire a control parameter used for the control of the transmission power and/or the control of the transmission directivity from a network-side apparatus. The control parameter includes a control parameter for traffic congestion time. The controller performs a control of decreasing the transmission power and/or a control of narrowing the transmission directivity, by applying the control parameter for traffic congestion time, if determining, based on the congestion situation parameter, that the traffic congestion occurs.

A network-side apparatus according to the embodiments is used in a system including a radio communication apparatus that is mounted on a vehicle and is configured to perform vehicle-to-vehicle communication with another vehicle by using a predetermined frequency band. The network-side apparatus comprises a controller configured to notify the radio communication apparatus of a control parameter for controlling a transmission power and/or a transmission directivity in the vehicle-to-vehicle communication to prevent generation of interference in the predetermined frequency band, based on a congestion situation parameter regarding a congestion situation of a road on which the vehicle travels.

The control parameter may include a control parameter for traffic congestion time. The controller changes the control parameter for traffic congestion time to decrease the transmission power and/or to narrow the transmission directivity, if determining, based on the congestion situation parameter, that the traffic congestion occurs.

The congestion situation parameter may include at least one of a movement speed of the vehicle; a distance between the vehicle and another vehicle; a vehicle traffic amount on the road; and the number of radio communication apparatuses configured to perform vehicle-to-vehicle communication in a predetermined area where the road is present.

The controller may request the radio communication apparatus to apply the control parameter for traffic congestion time, if determining that the traffic congestion occurs.

A network-side apparatus according to the embodiments comprises a controller configured to notify a radio communication apparatus utilizing a device-to-device (D2D) proximity service, of a directivity control parameter for controlling a transmission directivity in the D2D proximity service.

The directivity control parameter may be associated with a transmission resource pool used for transmission in the D2D proximity service.

The controller may notify, by a broadcast signaling, the radio communication apparatus of the directivity control parameter.

Mobile Communication System

Hereinafter, configuration of an LTE (Long Term Evolution) system which is the mobile communication system according to the embodiments will be described below. The LTE system is a system in which specifications are formulated in 3rd Generation Partnership Project (3GPP).

(1) Configuration of the Mobile Communication System

First, the configuration of the LTE system will be described. FIG. 1 is a diagram illustrating the configuration of the LTE systems. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio communication apparatus. The UE 100 is a mobile radio communication apparatus and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/ S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a mobile communication network.

(2) Configuration of Radio Interface

Figure 2:
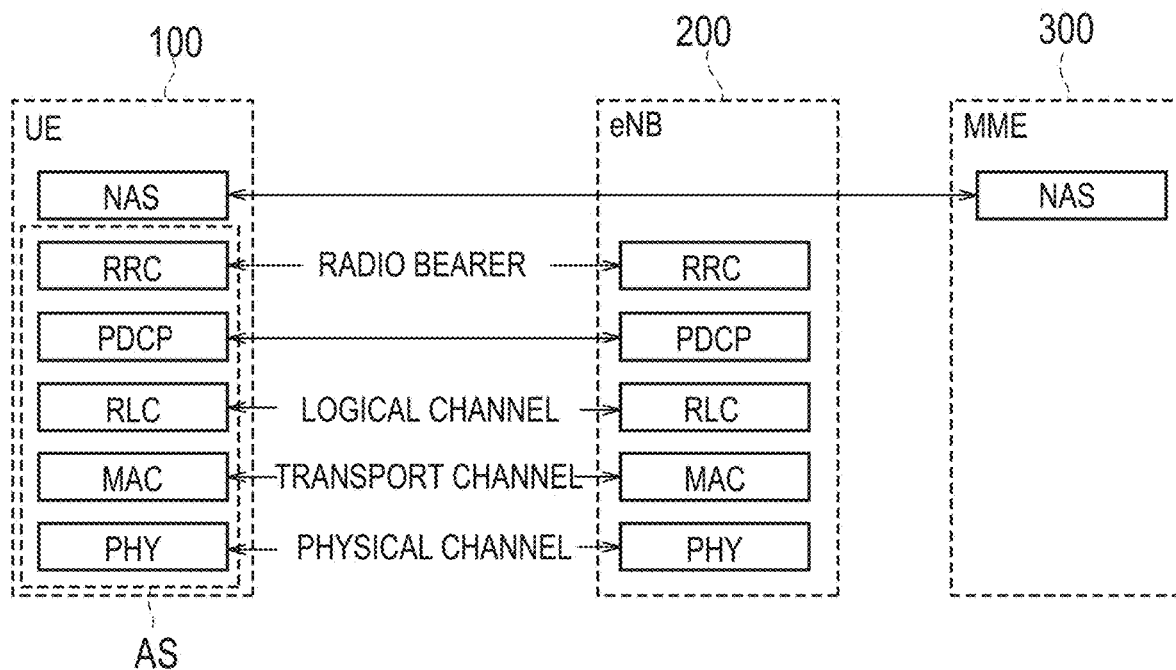
FIG. 2 is a protocol stack diagram of a radio interface in the LTE system.

Next, the protocol stack of the radio interface in the LTE system will be described. FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

In the UE 100, the physical layer, the MAC layer, the RLC layer, the PDCP layer, and the RRC layer constitute an AS (Access Stratum) entity that communicates with the eNB 200. The NAS layer constitutes a NAS entity communicating with the EPC 20.

(3) Configuration of Radio Frame

Figure 3:
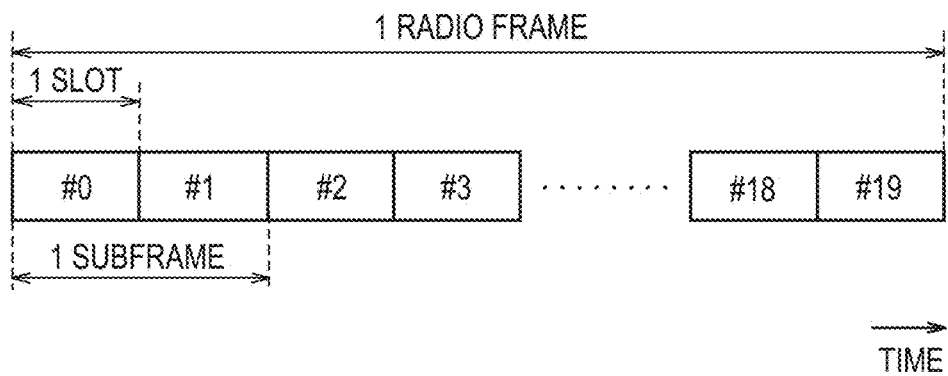
FIG. 3 is a configuration diagram of a radio frame used in the LTE system.

Next, the configuration of the radio frame in the LTE system in the LTE system will be described. FIG. 3 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 3, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

(4) Configuration of Radio Communication Apparatus

Figure 4:
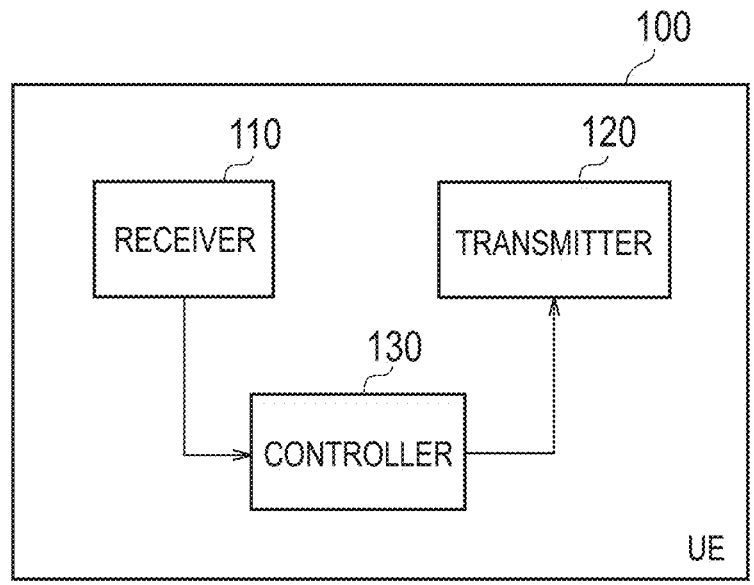
FIG. 4 is a block diagram of a UE.

Next, a configuration of the UE 100 being a radio communication apparatus according to an embodiment will be described. The UE 100 according to the embodiment, which will be described in detail later, is mounted on a vehicle (an automobile and the like). FIG. 4 is a block diagram of the UE 100. As illustrated in FIG. 4, the UE 100 includes a receiver 110, a transmitter 120, and a controller 130.

The receiver 110 performs various types of receptions under control of the controller 130. The receiver 110 includes an antenna and a receiver unit. The receiver unit converts a radio signal received by the antenna into a baseband signal (received signal), and outputs the baseband signal to the controller 130.

The transmitter 120 performs various types of transmissions under control of the controller 130. The transmitter 120 includes an antenna and a transmitter unit. The transmitter unit converts a baseband signal (transmitted signal) output from the controller 130 into a radio signal, and transmits the radio signal from the antenna.

The antenna of the UE 100 may include an omnidirectional antenna and a plurality of directional antennas and be capable of switching these antennas. The plurality of directional antennas differ in directivity area. Alternatively, the antenna of the UE 100 may be an antenna array including a plurality of antenna elements. The antenna array may be capable of switching between a directional transmission and an omnidirectional transmission, and adjusting the directivity area.

The controller 130 performs various types of controls in the UE 100. The controller 130 includes a processor and a memory. The memory stores a program executed by the processor, and information used for a process by the processor. The processor includes a baseband processor that performs modulation and demodulation, coding and decoding, and the like on a baseband signal, and a CPU (Central Processing Unit) that executes the program stored in the memory to perform various types of processes. The processor may include a codec that performs coding and decoding on sound and video signals. The processor executes various types of communication protocols described above and processes described later.

The UE 100 may include various types of receivers and measurement instruments. Alternatively, the UE 100 may be connected by wire or wireless to the various types of receivers and measurement instruments mounted in a vehicle. The various types of receivers and measurement instruments may include at least one of a GPS receiver configured to receive a GPS (Global Positioning System) signal to measure geographical location information, a speed meter configured to measure a speed, an accelerometer configured to measure acceleration, an optical beacon receiver configured to receive an optical beacon, and an ultrasonic sensor configured to measure a distance between vehicles.

(5) Configuration of Network-Side Apparatus

Next, a configuration of the network-side apparatus according to the embodiment will be described. The network-side apparatus according to the embodiment is the eNB 200 (base station). The network-side apparatus may include the eNB 200 and the EPC 20. Alternatively, the network-side apparatus may include the eNB 200 and an OAM (Operations Administration Maintenance).

Figure 5:
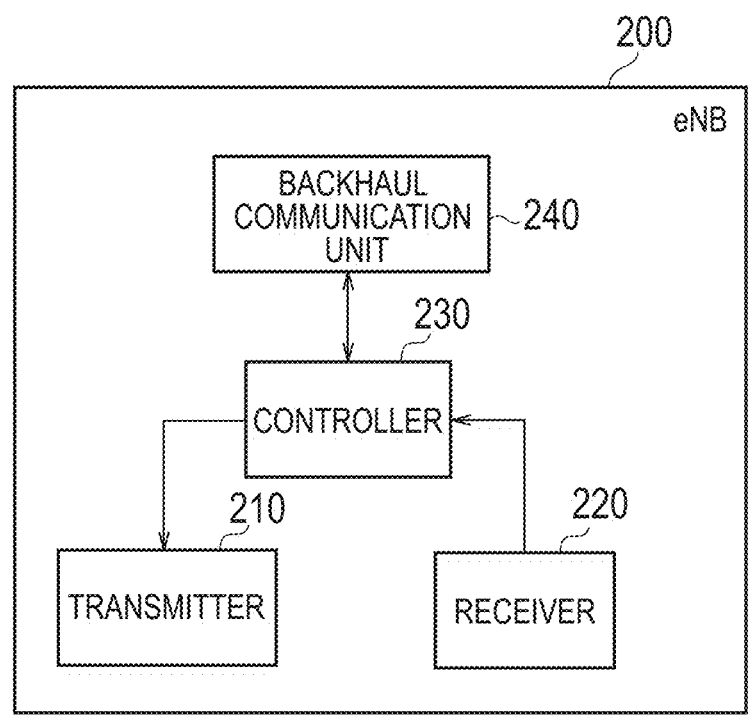
FIG. 5 is a block diagram of an eNB.

FIG. 5 is a block diagram of the eNB 200. As illustrated in FIG. 5, the eNB 200 includes: a transmitter 210, a receiver 220, a controller 230, and a backhaul communication unit 240.

The transmitter 210 performs various types of transmissions under control of the controller 230. The transmitter 210 includes an antenna and a transmitter unit. The transmitter unit converts a baseband signal (transmitted signal) output from the controller 230 into a radio signal, and transmits the radio signal from the antenna.

The receiver 220 performs various types of receptions under control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program executed by the processor, and information used for a process by the processor. The processor includes a baseband processor that performs modulation and demodulation, encoding and decoding, and the like on a baseband signal, and a CPU that executes the program stored in the memory to perform various types of processes. The processor executes various types of communication protocols described above and processes described later.

The backhaul communication unit 240 is connected to a neighbour eNB 200 via the X2 interface and is connected to the MME/S-GW 300 via the S1 interface. The backhaul communication unit 240 is utilized in communication performed on the X2 interface and communication performed on the S1 interface.

First Embodiment

A first embodiment will be described, below.

(1) Application Scenario

An application scenario according to the first embodiment will be described. FIG. 6 is a diagram illustrating the application scenario according to the first embodiment.

As illustrated in FIG. 6, the eNB 200 is provided on a building structure such as a building and forms a cell of a predetermined frequency band. The predetermined frequency band is a cellular frequency band allocated to an operator of the mobile communication network. Alternatively, the predetermined frequency band may be a frequency band shared by a plurality of operators or a plurality of communication systems (unlicensed band or the like, for example).

In the cell of the eNB 200, there is a road R on which a plurality of vehicles V are traveling. In each vehicle V, the radio communication apparatus (UE 100) is mounted. The UE 100 mounted in the vehicle V performs vehicle-to-vehicle communication with another vehicle V, by using the predetermined frequency band. Hereinafter, the UE 100 mounted in the vehicle V is referred to as "vehicle-mounted UE 100".

The vehicle-to-vehicle communication is one type of a D2D proximity service. In the D2D proximity service, the vehicle-mounted UE 100 transmits and receives a radio signal via a direct radio link not passing through the eNB 200. Such a direct radio link is called "side link". As a scheme of the D2D proximity service, two schemes, that is, a side link direct discovery and a side link direct communication, are defined. To the vehicle-to-vehicle communication, the side link direct discovery may be applied, and the side link direct communication may be applied.

FIG. 7 is a diagram illustrating a coverage of a radio signal in the vehicle-to-vehicle communication (D2D proximity service). As illustrated in FIG. 7, the vehicle-mounted UE 100 uses a predetermined transmission power to perform an omnidirectional transmission of a radio signal for the vehicle-to-vehicle communication. The vehicle-mounted UE 100 determines a transmission power (such as a maximum transmission power) in the vehicle-to-vehicle communication, based on a transmission power control parameter notified from the eNB 200.

Such a vehicle-to-vehicle communication has the following problems. Firstly, in a case of a traffic congestion or the like, in an area surrounding the road, an interference is applied to a resource of a cellular band for a long period of time. That is, the vehicle-to-vehicle communication applies an interference to the cellular communication (communication between the UE 100 and the eNB 200) for a long period of time. Secondly, as a result of traffic congestion or the like, a large number of vehicle-mounted UEs 100 are concentrated in a narrow area, and a conflict of radio resources occurs. That is, the vehicle-to-vehicle communications apply the interference to each other.

(2) Operation Overview According to First Embodiment

Next, an overview of an operation according to the first embodiment will be described. The vehicle-mounted UE 100 according to the first embodiment performs vehicle-to-vehicle communication with another vehicle V, by using the predetermined frequency band. The vehicle-mounted UE 100 controls the transmission power and/or the transmission directivity in the vehicle-to-vehicle communication to prevent the generation of interference in the predetermined frequency band, based on a congestion situation parameter regarding a congestion situation of a road on which the vehicle V including the vehicle-mounted UE 100 travels.

The vehicle-mounted UE 100 performs a control of decreasing the transmission power and/or a control of narrowing the transmission directivity, based on the congestion situation parameter, if determining that the traffic congestion occurs. The congestion situation parameter includes a movement speed of the vehicle V and/or a distance between the vehicle V and the other vehicle V. The vehicle-mounted UE 100 determines, based on the decrease of the movement speed and/or the shortening of the distance, that the traffic congestion occurs. If determining based on the congestion situation parameter that the traffic congestion does not occur, the vehicle-mounted UE 100 may perform the omnidirectional transmission.

FIGS. 8A, 8B, 8C and 8D are diagrams illustrating examples of the control of the transmission power and/or the transmission directivity according to the first embodiment.

Figure 8A:
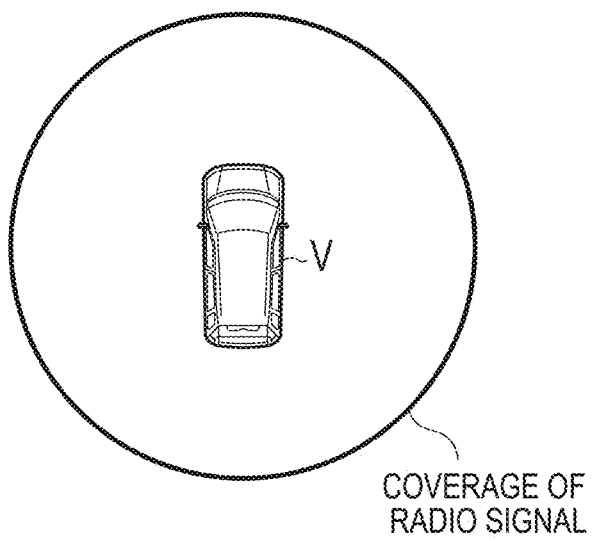
FIGS. 8A, 8B, 8C and 8D are diagrams illustrating examples of a control of a transmission power and/or a transmission directivity according to the first embodiment to the third embodiment.

As illustrated in FIG. 8A, if determining that the traffic congestion does not occur, the vehicle-mounted UE 100 performs the omnidirectional transmission with a normal transmission power. The vehicle-mounted UE 100 may perform the directional transmission with the normal transmission power and a wider directivity, instead of performing the omnidirectional transmission with the normal transmission power. The directivity is oriented forward and backward relative to the traveling direction of the vehicle V.

Figure 8B:
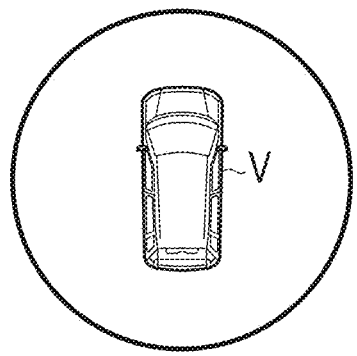
Figure 8C:
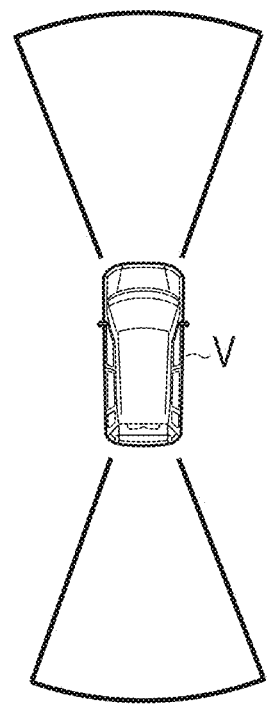
Figure 8D:
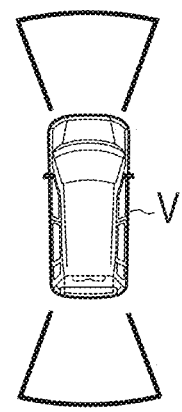

On the other hand, if determining that the traffic congestion occurs, any one of controls FIG. 8B to FIG. 8D is performed. In the control method illustrated in FIG. 8B, the vehicle-mounted UE 100 performs a control to decrease the transmission power. In the control method illustrated in FIG. 8C, the vehicle-mounted UE 100 performs a control to narrow the transmission directivity. "Narrowing the transmission directivity" is not limited to switching from a wide directivity to a narrow directivity, and includes switching from the omnidirectional transmission to the directional transmission. In the control method illustrated in FIG. 8D, the vehicle-mounted UE 100 performs a control to decrease the transmission power and a control to narrow the transmission directivity.

Figure 9:
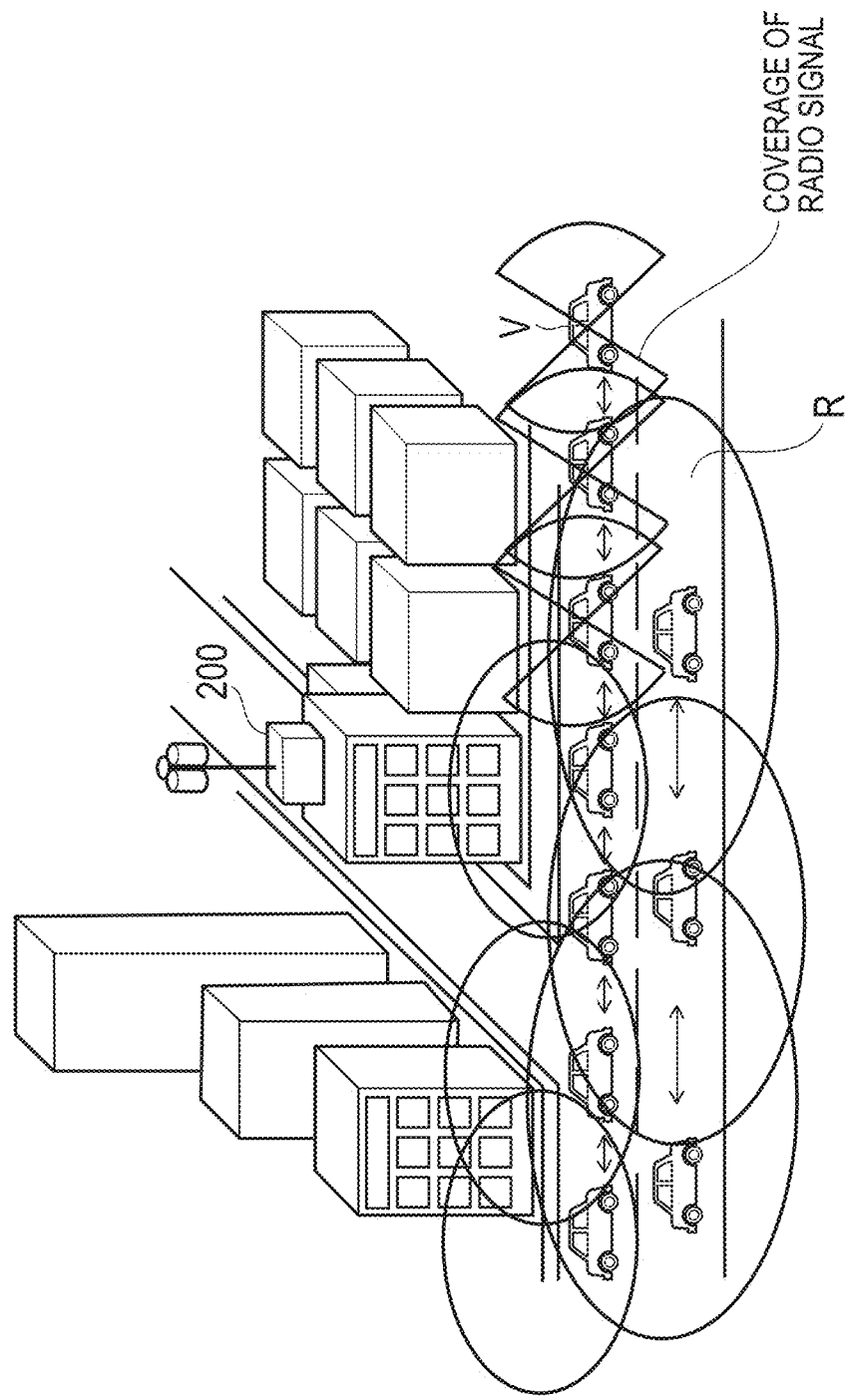
FIG. 9 is a diagram illustrating a coverage of a radio signal if a transmission power and/or a transmission directivity according to the first embodiment to the third embodiment is controlled.

FIG. 9 is a diagram illustrating a coverage of a radio signal if a control of a transmission power and/or a transmission directivity according to the first embodiment is performed.

As illustrated in FIG. 9, the vehicle-mounted UE 100 determines that the traffic congestion occurs, and performs a control of decreasing the transmission power and/or a control of narrowing the transmission directivity. As a result, it is possible to avoid the vehicle-to-vehicle communication from interfering with the cellular communication for a long period of time and the vehicle-to-vehicle communications from interfering with each other.

(3) Operation Sequence and Operation Flow According to First Embodiment

Figure 10:
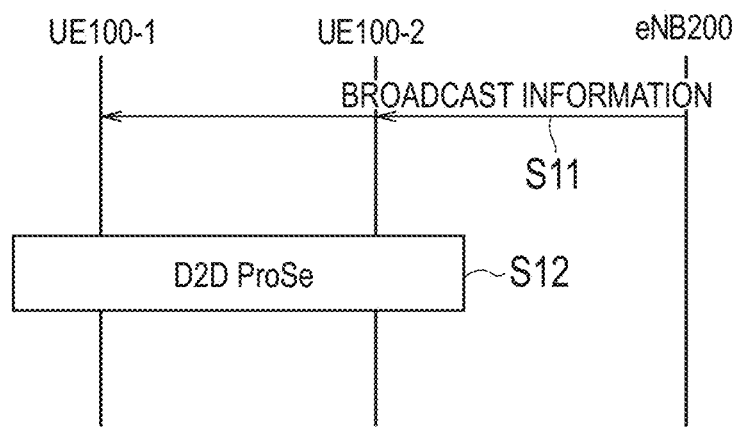
FIG. 10 is a diagram illustrating an operation sequence according to the first embodiment.

Next, an operation sequence and an operation flow according to the first embodiment will be described. FIG. 10 is a diagram illustrating the operation sequence according to the first embodiment.

As illustrated in FIG. 10, in step S11, the eNB 200 transmits broadcast information on the D2D proximity service. A vehicle-mounted UE 100-1 and a vehicle-mounted UE 100-2 utilizing the D2D proximity service receive the broadcast information from the eNB 200.

In the first embodiment, the broadcast information on the D2D proximity service is a system information block type 18 (SIB18) being a broadcast RRC signaling on the side link direct communication or a system information block type 19 (SIB19) being a broadcast RRC signaling on the side link direct communication.

Figure 11:
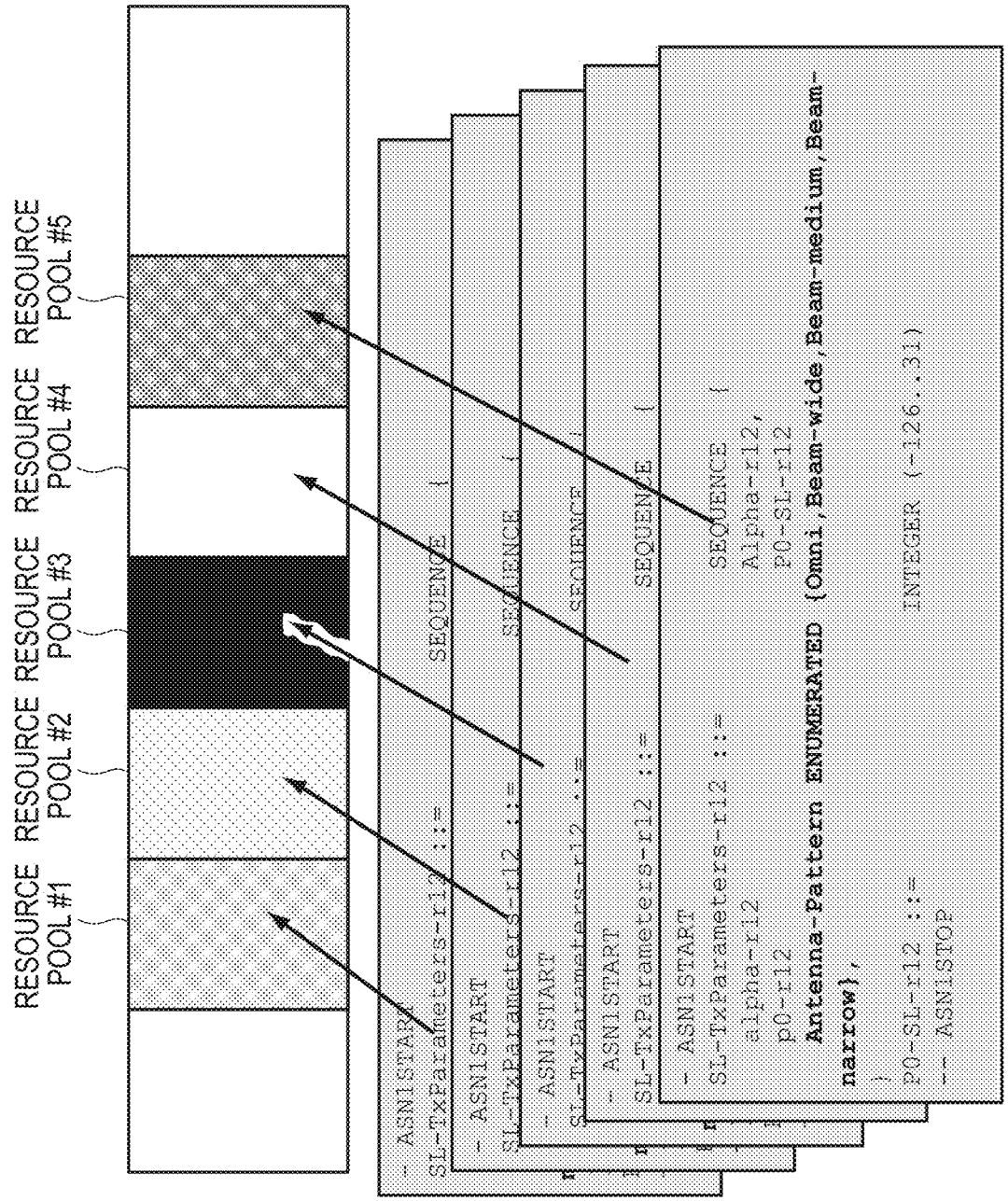
FIG. 11 is a diagram illustrating an example of a control parameter according to the first embodiment to the third embodiment.

The broadcast information on the D2D proximity service includes a resource pool including a radio resource available for the D2D proximity service, and a control parameter (SL-TxParameter) associated with the resource pool. FIG. 11 is a diagram illustrating an example of the control parameter according to the first embodiment.

As illustrated in FIG. 11, the control parameter (SL-TxParameter) is set for each resource pool. The control parameter (SL-TxParameter) includes a transmission power control parameter (alpha-r12, p0-r12) for performing a control (open loop control) on the transmission power in the D2D proximity service, and a directivity control parameter (Antenna-Pattern) for performing a control on the transmission directivity in the D2D proximity service. As the directivity control parameter (Antenna-Pattern), any one of an omnidirectional transmission (Omini), a wide beam transmission (Beam-wide), a medium beam transmission (Beam-medium), and a narrow beam transmission (Beam-narrow) is set.

In the first embodiment, a plurality of resource pools #1 to #4 include a specific resource pool (resource pool for traffic congestion time) associated with a control parameter for traffic congestion time. For example, the resource pool #4 is the resource pool for traffic congestion time. The broadcast information on the D2D proximity service may include information for recognizing which resource pool is the resource pool for traffic congestion time. Alternatively, the resource pool for traffic congestion time may be previously defined in a system specification.

The control parameter for traffic congestion time is a control parameter set to prevent generation of interference. The control parameter for traffic congestion time includes a transmission power control parameter for traffic congestion time and/or a directivity control parameter for traffic congestion time. The transmission power control parameter for traffic congestion time is a transmission power control parameter set so that the transmission power in the D2D proximity service is decreased than a normal transmission power control parameter. The directivity control parameter for traffic congestion time is a directivity control parameter set so that the transmission directivity in the D2D proximity service is narrowed than a normal directivity control parameter.

Returning to FIG. 10, in step S12, the vehicle-mounted UE 100-1 and the vehicle-mounted UE 100-2 perform the D2D proximity service (specifically, the vehicle-to-vehicle communication), based on the broadcast information received from the eNB 200. If determining based on the congestion situation parameter that the traffic congestion occurs, each vehicle-mounted UE 100 applies the control parameter for traffic congestion time to perform a control of decreasing the transmission power and/or a control of narrowing the transmission directivity.

Figure 12:
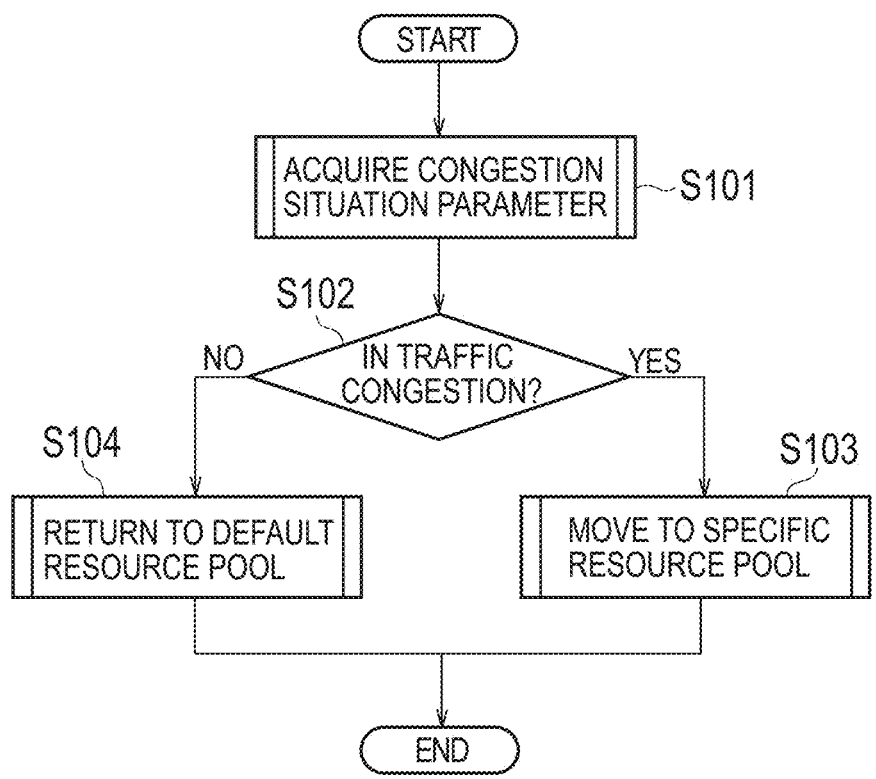
FIG. 12 is a diagram illustrating an operation flow of a vehicle-mounted UE according to the first embodiment.

FIG. 12 is a diagram illustrating an operation flow of the vehicle-mounted UE 100 according to the first embodiment. Specifically, the operation flow illustrates a detail of step S12 in FIG. 10. The operation flow may be executed periodically.

As illustrated in FIG. 12, in step S101, the vehicle-mounted UE 100 acquires the congestion situation parameter regarding a congestion situation of a road on which the vehicle V including the vehicle-mounted UE 100 travels. The congestion situation parameter includes a movement speed of the vehicle V and/or a distance between the vehicle V and another vehicle V (that is, a distance between vehicles). The movement speed of the vehicle V can be obtained by using at least one of a GPS receiver, a speed meter, and an accelerometer, for example. The distance between vehicles can be obtained by using an ultrasonic sensor, for example. The distance between vehicles may be a distance between a preceding vehicle and a subject vehicle, and may be a distance between a succeeding vehicle and the subject vehicle.

In step S102, the vehicle-mounted UE 100 determines based on the congestion situation parameter whether or not the traffic congestion occurs. For example, the vehicle-mounted UE 100 determines that the traffic congestion occurs if the movement speed falls below a threshold value. The vehicle-mounted UE 100 may determine that the traffic congestion occurs if the distance between vehicles falls below a threshold value. Alternatively, the vehicle-mounted UE 100 may determine that the traffic congestion occurs if the movement speed falls below a threshold value 1 and the distance between vehicles falls below a threshold value 2.

If determining that the traffic congestion occurs (step S102: YES), in step S103, the vehicle-mounted UE 100 selects a specific resource pool (resource pool for traffic congestion time) and moves to vehicle-to-vehicle communication (D2D proximity service) using the specific resource pool. Specifically, the vehicle-mounted UE 100 uses a radio resource included in the specific resource pool, for the vehicle-to-vehicle communication, and controls the transmission power and/or the transmission directivity, based on the control parameter for traffic congestion time.

On the other hand, if determining that the traffic congestion does not occur (step S102: NO), in step S104, the vehicle-mounted UE 100 selects a default resource pool and returns to vehicle-to-vehicle communication (D2D proximity service) using the default resource pool. Specifically, the vehicle-mounted UE 100 uses the radio resource included in the default resource pool, for the vehicle-to-vehicle communication, and controls the transmission power and/or the transmission directivity, based on the normal control parameter.

Second Embodiment

A second embodiment will be described while focusing on a difference from the first embodiment, below. An application scenario according to the second embodiment is similar to that of the first embodiment (see FIG. 6).

Figure 13:
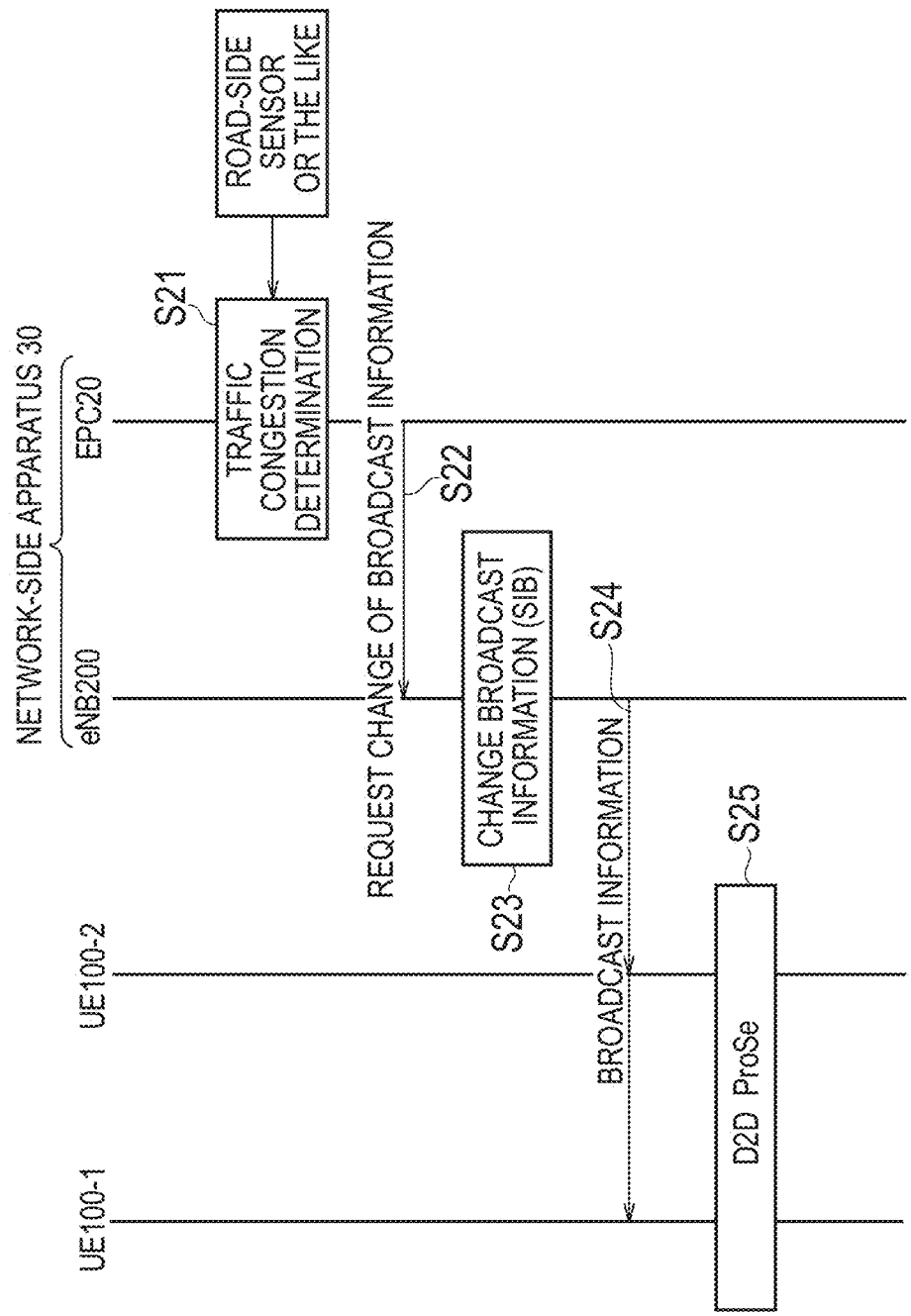
FIG. 13 is a diagram illustrating an operation sequence according to the second embodiment.

FIG. 13 is a diagram illustrating an operation sequence according to the second embodiment.

As illustrated in FIG. 13, a network-side apparatus 30 according to the second embodiment notifies the vehicle-mounted UE 100 of a control parameter for controlling a transmission power and/or a transmission directivity in the vehicle-to-vehicle communication to prevent generation of interference in a predetermined frequency band, based on the congestion situation parameter regarding the congestion situation of the road on which the vehicle V travels.

Specifically, in step S21, the EPC 20 determines, based on a congestion situation parameter obtained by using a road-side sensor or the like whether or not the traffic congestion occurs on a road R within a cell of the eNB 200. Here, it is assumed that the traffic congestion occurs on the road R within the cell of the eNB 200. Such a determination may be made by not only the EPC 20 but also the OAM.

In step S22, the EPC 20 (or the OAM) requests the eNB 200 to change the broadcast information on the D2D proximity service.

In step S23, the eNB 200 changes the control parameter for traffic congestion time to decrease the transmission power and/or to narrow the transmission directivity in the vehicle-to-vehicle communication (D2D proximity service).

In step S24, the eNB 200 transmits the broadcast information on the D2D proximity service. As described above, the broadcast information on the D2D proximity service is the SIB 18 or the SIB 19. The vehicle-mounted UE 100-1 and the vehicle-mounted UE 100-2 utilizing the D2D proximity service receive the broadcast information from the eNB 200. The broadcast information is similar in configuration to the first embodiment.

In step S25, the vehicle-mounted UE 100-1 and the vehicle-mounted UE 100-2 perform the D2D proximity service (specifically, the vehicle-to-vehicle communication), based on the broadcast information received from the eNB 200. If determining based on the congestion situation parameter that the traffic congestion occurs, each vehicle-mounted UE 100 applies the control parameter for traffic congestion time to perform a control of decreasing the transmission power and/or a control of narrowing the transmission directivity.

Figure 14:
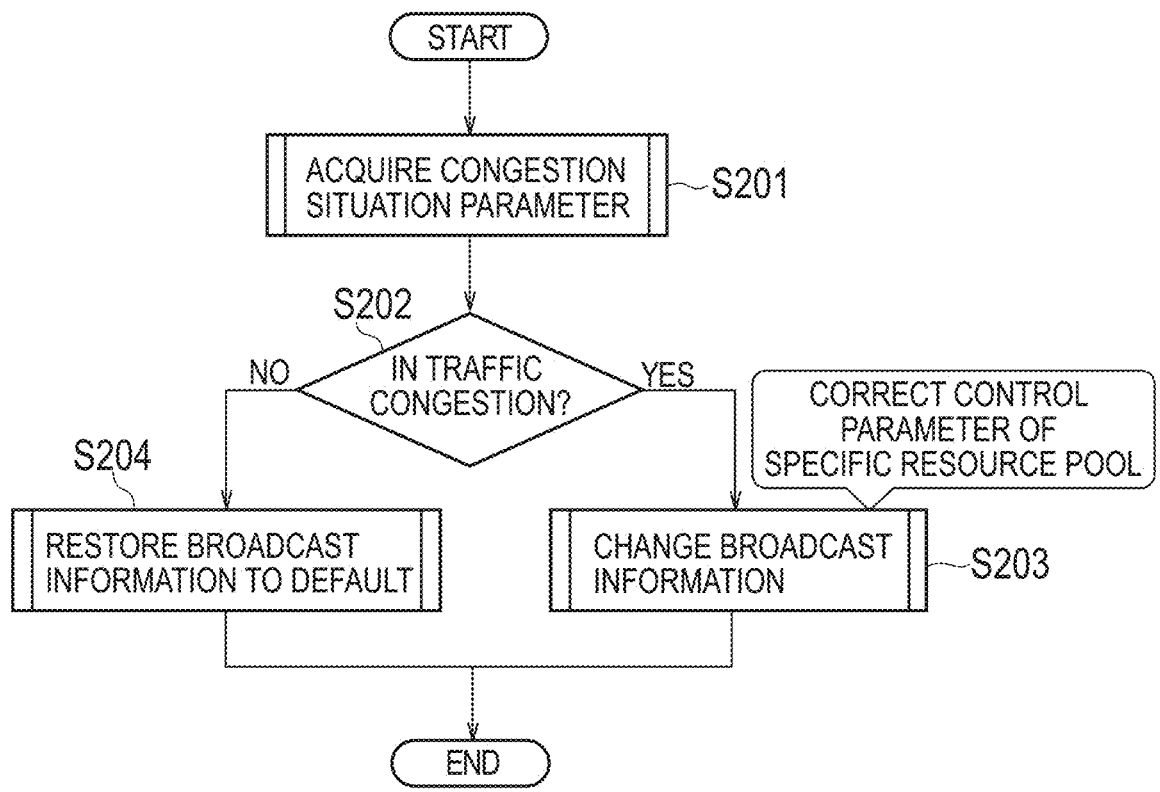
FIG. 14 is a flowchart illustrating an operation flow of a network-side apparatus according to the second embodiment.

FIG. 14 is a diagram illustrating an operation flow of the network-side apparatus 30 according to the second embodiment. The operation flow may be executed periodically.

As illustrated in FIG. 14, in step S201, the network-side apparatus 30 acquires the congestion situation parameter regarding a congestion situation of a road present in the cell of the eNB 200.

In the second embodiment, the congestion situation parameter includes at least one of a movement speed of a vehicle, a distance between one vehicle and another vehicle (distance between vehicles), a vehicle traffic amount on a road, and the number of UEs performing the vehicle-to-vehicle communication (D2D proximity service) in a predetermined area (specifically, a cell of the eNB 200) where a road is present. The movement speed and the distance between vehicles may be an average value of the movement speed of the vehicle in the cell of the eNB 200 and an average value of the distance between vehicles therein. The vehicle traffic amount is the number of vehicles to be passed per unit time at a measurement point in the cell of the eNB 200. Here, the vehicle traffic amount may be an average value of a plurality of measurement points. The number of UEs performing the vehicle-to-vehicle communication (D2D proximity service) can be estimated based on a notification from the UE 100, for example.

In step S202, the network-side apparatus 30 determines based on the congestion situation parameter whether or not the traffic congestion occurs. As a method of determining a traffic congestion, a similar method to that of the first embodiment may be applied. The network-side apparatus 30 may determine that the traffic congestion occurs if the vehicle traffic amount exceeds a predetermined amount. The network-side apparatus 30 may determine that the traffic congestion occurs if the number of UEs performing the vehicle-to-vehicle communication (D2D proximity service) exceeds a predetermined number.

If determining that the traffic congestion occurs (step S202: YES), in step S203, the network-side apparatus 30 changes a control parameter (control parameter for traffic congestion time) associated with a specific resource pool (resource pool for traffic congestion time). Specifically, the network-side apparatus 30 changes the control parameter for traffic congestion time to decrease the transmission power and/or to narrow the transmission directivity in the vehicle-to-vehicle communication (D2D proximity service).

On the other hand, if determining that the traffic congestion does not occur (step S202: NO), in step S204, the network-side apparatus 30 restores the control parameter (control parameter for traffic congestion time) associated with the specific resource pool (resource pool for traffic congestion time) to default.

Third Embodiment

A third embodiment will be described while focusing on a difference from the first embodiment and the second embodiment, below.

FIG. 15 is a diagram illustrating an operation sequence according to the third embodiment.

As illustrated in FIG. 15, the network-side apparatus 30 according to the third embodiment requests the vehicle-mounted UE 100 to apply the control parameter for traffic congestion time, if determining that the traffic congestion occurs.

Specifically, in step S31, the EPC 20 determines, based on the congestion situation parameter obtained by using a road-side sensor or the like whether or not the traffic congestion occurs on a road R within a cell of the eNB 200. Here, it is assumed that the traffic congestion occurs on the road R within the cell of the eNB 200. Such a determination may be made by not only the EPC 20 but also the OAM.

In step S32, the EPC 20 (or the OAM) requests the eNB 200 to change the broadcast information on the D2D proximity service.

In step S33, the eNB 200 changes the control parameter for traffic congestion time to decrease the transmission power and/or to narrow the transmission directivity in the vehicle-to-vehicle communication (D2D proximity service).

In step S34, the eNB 200 transmits the broadcast information on the D2D proximity service. As described above, the broadcast information on the D2D proximity service is the SIB 18 or the SIB 19. A vehicle-mounted UE 100-1 and a vehicle-mounted UE 100-2 utilizing the D2D proximity service receive the broadcast information from the eNB 200. The broadcast information is similar in configuration to the first embodiment.

In steps S35 and S36, the eNB 200 requests the vehicle-mounted UE 100-1 and the vehicle-mounted UE 100-2 to apply a specific resource pool (resource pool for traffic congestion time). Such a request may be transmitted by a dedicated RRC signaling destined to each UE 100. The dedicated RRC signaling is an RRC Connection Reconfiguration message, for example.

In steps S37 and S38, the vehicle-mounted UE 100-1 and the vehicle-mounted UE 100-2 transmit, to the eNB 200, a response indicating that a specific resource pool (resource pool for traffic congestion time) is applied. Such a response is an RRC Connection Reconfiguration Complete message, for example.

In step S39, the vehicle-mounted UE 100-1 and the vehicle-mounted UE 100-2 apply the specific resource pool and the control parameter for traffic congestion time, based on the broadcast information and the request received from the eNB 200 to perform the vehicle-to-vehicle communication (D2D proximity service).

OTHER EMBODIMENTS

In the above-described embodiments, the specific example of the congestion situation parameter was described. However, the congestion situation parameter is not limited to the parameter according to the embodiments. For example, the congestion situation parameter may be set based on prediction of a temporal change of congestion, a time, a weather, a place, or the like.

In the above-described embodiments, an example is described in which the eNB 200 notifies, by the broadcast RRC signaling, the UE 100 of the control parameter for traffic congestion time. However, the control parameter for traffic congestion time may be notified by a dedicated RRC signaling destined to the UE 100. The dedicated RRC signaling is an RRC Connection Reconfiguration message, for example.

Further, in the above-described embodiments, an example is described in which the eNB 200 notifies the UE 100 of the control parameter for traffic congestion time. However, the control parameter for traffic congestion time may be previously set to the UE 100. In this case, the eNB 200 may not need to notify the UE 100 of the control parameter for traffic congestion time.

In the above-described embodiments, the LTE system is exemplified as the mobile communication system. However, the present application is not limited to the LTE system. The present application may be applied to systems other than the LTE system.

The entire content of Japanese Patent Application No. 2015-166353 (filed on Aug. 26, 2015) is incorporated in the present specification by reference.

INDUSTRIAL APPLICABILITY

The present application is useful in the field of radio communication.

The invention claimed is:

1. A user equipment configured to perform vehicle-to-vehicle communication by using a predetermined frequency band, the user equipment comprising:
a processor and a memory coupled to the processor, the processor is configured to:
receive a first control parameter and a second control parameter from a base station, the first and second control parameters controlling transmission power in the vehicle-to-vehicle communication, and the first and second control parameters associated to a movement speed of the user equipment,
determine whether the movement speed of the user equipment is above a threshold value, which is a particular speed value,
control the transmission power by applying the first control parameter when determining that the movement speed of the user equipment is above the threshold value, and
control the transmission power by applying the second control parameter when determining that the movement speed of the user equipment is below the threshold value.

2. The user equipment according to claim 1, wherein the processor is configured to receive the first control parameter and the second control parameter from the base station by broadcast RRC (Radio Resource Control) signaling.

3. The user equipment according to claim 1, wherein the processor is configured to receive the first control parameter and the second control parameter from the base station by dedicated RRC (Radio Resource Control) signaling.

4. The user equipment according to claim 1, wherein the first control parameter and the second control parameter are associated with a transmission resource pool configured to be used for transmission in the vehicle-to-vehicle communication.

5. A base station used in a system including a user equipment that is configured to perform vehicle-to-vehicle communication by using a predetermined frequency band, the base station comprising:
a processor and a memory coupled to the processor, the processor is configured to notify the user equipment of a first control parameter and a second control parameter, the first and second control parameters controlling transmission power in the vehicle-to-vehicle communication, and the first and second control parameters associated to a movement speed of the user equipment, wherein
the first parameter is applied to control the transmission power when the movement speed of the user equipment is above a threshold value, which is a particular speed value, and
the second parameter is applied to control the transmission power when the movement speed of the user equipment is below the threshold value.

* * * * *